United States Patent [19]
Darland et al.

[11] Patent Number: 4,500,751
[45] Date of Patent: Feb. 19, 1985

[54] DATA COMMUNICATION SYSTEM

[75] Inventors: Michael L. Darland; Donald L. Stoner; James W. Baker, Jr.; Michael A. Sponhnholtz, all of King County, Wash.

[73] Assignee: Microperipheral Corporation, Redmond, Wash.

[21] Appl. No.: 400,060

[22] Filed: Jul. 20, 1982

[51] Int. Cl.³ ............................................ H04M 11/00
[52] U.S. Cl. ................................ 179/2 DP; 179/2 CA
[58] Field of Search ................. 179/2 A, 2 CA, 2 DP, 179/6.3 CC, 90 K, 90 CS

[56] References Cited
U.S. PATENT DOCUMENTS 3,675,513  7/1972  Flanagan et al. ............ 179/2 DP X
3,822,363  7/1974  Moyer et al. ................ 179/2 DP X
4,342,986  8/1982  Buskirk et al. .

OTHER PUBLICATIONS

Baker et al., "Transaction Network, Telephones and Terminals:Transaction Stations"; *The Bell System Technical Journal*, vol. 57, No. 10, Dec. 1978, pp. 3487-3502.

*Primary Examiner*—Keith E. George
*Attorney, Agent, or Firm*—Seed and Berry

[57] ABSTRACT

A data communication system including a central host terminal and a large number of remote terminals communicating with the host terminal through telephone lines. The remote terminal decodes frequency-shift-keyed signals and modulates an RF generator to display the data represented by the FSK signals on a conventional television screen. The remote terminal also includes a keypad and conventional two-tone signal generator for transmitting data to the host terminal. The remote terminal may also include a card reader and a frequency-shift-keyed modulator for generating FSK signals corresponding to information magnetically recorded on a card. The host terminal includes a TOUCH-TONE decoder for providing data signals indicative of the information from the remote terminals, an FSK decoder for generating data signals indicative of the information contained on cards read by the remote terminals, and an FSK modulator for transmitting FSK signals to the remote terminals. The FSK modulator in the host terminal switches from one frequency to another only at the zero crossings of the signal in order to prevent unwanted harmonics from being generated on the telephone lines. In order to allow the remote terminals to transmit alphanumeric data, a number of twelve-key keypads may be combined using circuitry which generates a keypad-identifying signal each time a key is pressed to uniquely identify the depressed key.

18 Claims, 13 Drawing Figures

DATA COMMUNICATION SYSTEM

TECHNICAL FIELD

This invention relates to a system for transferring digital data and, more particularly, to a system for allowing a host station to communicate through the telephone lines with a large number of remote stations, each of which includes a TOUCH-TONE keypad and a conventional television set.

BACKGROUND ART

Communications systems for transferring digital data between two points are being used with increasing frequency, most commonly to allow one computer to access another computer. Although the cost of such systems has markedly decreased, the cost is nevertheless substantial enough to prevent widespread use of such systems in the home. However, widespread home use of such systems would allow users to automatically perform a wide variety of transactions. For example, individuals could perform most of their banking from the home by accessing a bank computer to transfer money from one account to another. Similarly, individuals could direct a bank computer to pay their bills from an account. Although the advantages of widespread residential data communication systems would be many, the relatively high cost of such systems has precluded such use.

Another problem with conventional data communication systems stems from the requirements of signals which are allowed to be transmitted over the telephone lines. Telephone companies generally require that the signal transmitted over the telephone lines be within a certain bandwidth and amplitude so that it does not interfere with signals on other lines. These telephone company requirements have limited, to some degree, the options which one can use to transmit data over telephone lines. The most common data communication technique is frequency shift keying (FSK), by which each of two binary states are represented by a sine wave of a respective frequency. However, shifting from one frequency to another can produced spurious signals outside of the allowable bandwidth.

Another common technique for transferring digital data over telephone lines utilizes conventional two-tone generators which are driven by conventional sixteen-button TOUCH-TONE keypads. A serious limitation of this data communication technique is that, since only sixteen discrete characters can be selected, the keypad is capable of sending only numeric data as opposed to alpha numeric data.

DISCLOSURE OF INVENTION

The primary object of the invention is to provide a system for allowing a large number of residential customers to communicate with a central computer using a conventional telephone and television.

It is another object of the invention to provide a data communication system of the character described which is relatively inexpensive, thus permitting widespread residential use of such a system.

It is still another object of the invention to provide a frequency-shift-keyed modulator which switches between frequencies in a manner that does not produce unwanted harmonics.

It is a further object of the invention to adapt several conventional twelve-key TOUCH-TONE keypad and tone generators for use as a forty-eight key keypad and tone generator so that alpha numeric data may be transmitted through telephone lines.

These and other objects of the invention are provided by a host terminal, which may be connected to any one of a large number of remote terminals through the telephone lines. Each remote terminal includes a frequency-shift-keyed decoder for generating a data signal corresponding to data received through the telephone line in the form of a frequency-shift-keyed (FSK) signal. The remote terminal also includes a video display generator producing a video signal corresponding to a video picture that displays the received data in an RF modulator generating an RF signal that is modulated by the video signal. The remote terminal also includes a keypad having a plurality of keys which operate a two-tone signal generator connected to the telephone line for allowing data communication from the remote terminal to the host terminal. The host terminal includes an FSK modulator and a two-tone decoder connected to the telephone line for transmitting an FSK signal encoded from an external device, such as a computer, and for receiving the two-tone signals from the remote terminal and generating a corresponding data stream. The remote terminal may also include a card reader for generating an FSK signal indicative of information magnetically recorded on a card. In such cases, the host terminal will also include an FSK decoder for generating a digital signal corresponding to the FSK signal from the card reader. The frequency-shift-keyed modulator of the host terminal may be adapted for shifting between frequencies at the zero degree point of the sine wave output. Accordingly, the output of the two-tone signal generator is applied to a zero-crossing detector which generates a trigger pulse each time the output of the signal generator passes through zero volts. The data signal that controls the two-tone signal generator is applied to the data input of a flip-flip, and the output of the flip-flop is applied to the signal generator. The clock input of the flip-flop receives the output of the zero-crossing detector. As a result, the data signal can switch the signal generator from one frequency to another only when the zero-crossing detector generates a trigger pulse which occurs at the zero-crossing point of the signal generator output. In order to allow alphanumeric data communication, two or more twelve-key TOUCH-TONE keypads may be combined. Corresponding keys of each twelve-key keypad are connected to the same inputs of the two-tone signal generator. In order to identify which keypad is actuating the signal generator, the group of keys in each keypad triggers a corresponding timer when the key is released. The timer then actuates the signal generator through one of its inputs to generate a tone that identifies which keypad is being actuated when the key in that pad is released.

BEST MODE FOR CARRYING OUT THE INVENTION

Figure 1:
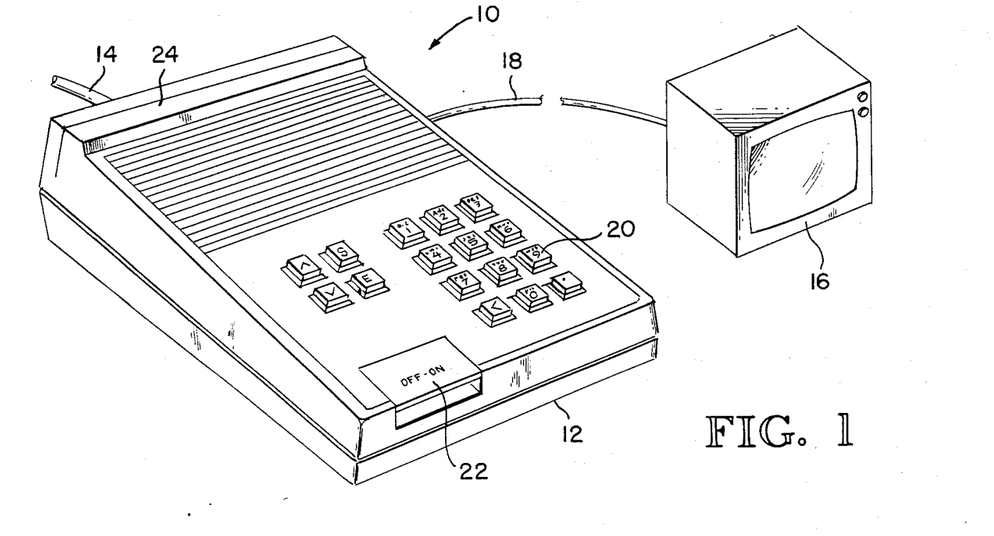
FIG. 1 is an isometric view of a remote terminal of the data communication system.

The remote terminal 10, as illustrated in FIG. 1, includes a control unit 12 connected to the telephone lines through line 14 and a conventional jack (not shown). The terminal 10 also includes a conventional television receiver 16 connected to the control unit 12 through an RF cable 18. Alternatively, of course, the control unit may directly modulate the video input of a video monitor.

The control unit 12 includes a conventional sixteen-button TOUCH-TONE keypad 20 or a special 48-button keypad (shown hereinafter) connected to a two-tone generator (not shown) and an on/off switch 22. As explained in greater detail hereinafter, the on/off switch 22 not only applies power to the control unit 12 from an internal battery or power supply, but it also connects the control unit 12 to the telephone line. As explained hereinafter, the control unit 12 also includes a conventional credit card reader for providing digital data indicative of information contained on a credit card inserted through slot 24.

In operation, the control unit 12 performs three functions. First, it receives frequency-shift-keyed (FSK) input signals and displays the corresponding information on the screen of the television set 16. Second, it transmits two-tone signals corresponding to which of the buttons of keypad 20 are pressed. Third, it transmits FSK signals indicative of information contained on a credit card inserted through slot 24.

The control unit 12 communicates through the telephone lines with a host terminal which also performs three functions. First, it receives and decodes the two-tone signals transmitted by the control unit 12 and converts the decoded signal into a serial data stream. Second, it receives the FSK signals from the card reader portion of the control unit 12 and transforms them into a serial data stream. Third, it converts a serial data stream to an FSK signal and transmits it to a control unit 12 through the telephone lines.

Figure 2:
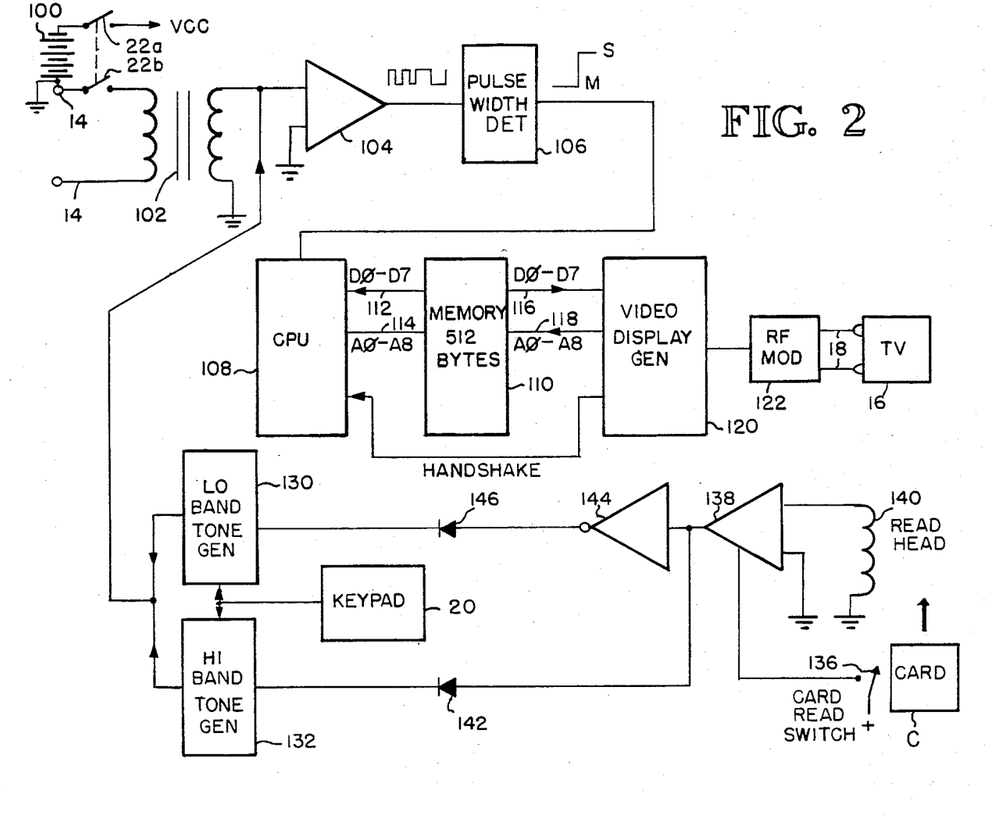
FIG. 2 is a schematic of the remote terminal of the data communication system.

The remote terminal, as illustrated schematically in FIG. 2, is turned on by closing switch 22, thereby applying power from battery 100 to the circuitry through switch contact 22a. At the same time, the telephone lines 14 are connected to an audio transformer 102 through switch contact 22b. The audio signal from the secondary of transformer 102 is applied to a conventional high-gain amplifier 104, which generates a square wave that is in phase with the audio signal. Insofar as the audio signal applied to the amplifier 104 is an FSK signal, the square wave generated by the amplifier 104 has a frequency that is one of two values. A pulse-width detector 106 determines the frequency of the square wave and generates a logic "0" level for the high-frequency "MARK" signal and a logic "1" level for the relatively low-frequency "SPACE" signal. The MARK or SPACE signals are applied to a central processing unit 108 which decodes the FSK signal. In practice, the FSK message begins with a START bit, which is a logic "0" to "1" MARK-to-SPACE transition. This START bit enables an internal timer in the CPU 108. The CPU then looks at the value of the pulse-width detector output at the center of each of the remaining eight bits, and then looks for a STOP bit, which is a logic "1" to "0" SPACE-to-MARK transition. The CPU 108 then stores the eight bits of data in a random-access memory 110.

The data is applied by the CPU 108 to the memory 110 through data bus 112 and it is stored in memory locations identified by the address byte on an address bus 114. Similarly, memory 110 applies an eight-bit byte of data to data bus 116, as determined by the address on address bus 118, in order to apply data to a video display generator 120. The video display generator 120 is a conventional integrated circuit which receives data in parallel corresponding to locations on a cathode-ray tube display and then generates a corresponding video signal. The video display generator thus contains its own internal oscillator and it also generates appropriate horizontal sync, vertical sync and retrace blanking signals. The video display generator 120 is applied to an RF modulator 122 that generates an RF signal on a channel that is unused by the TV set 16.

In order to ensure that the CPU 108 and video display generator 120 are not both accessing the memory 110 at the same time, the video display generator 120 applies a handshake signal to the CPU 108 when it is not accessing the memory 110. This handshake signal is principally generated when the video display generator 120 is retracing from the lower right-hand corner of the TV screen to the upper left-hand corner, and is thus not accessing the memory 110.

The FSK signal received by the remote station 10 thus identifies which portion of each line of the CRT that is to be illuminated in order to generate a predetermined message on the screen of the TV set 16. In this manner, a computer at the host station can send messages to a user at a large number of remote locations.

As mentioned above, the remote station is also adapted to send either two-tone signals or an FSK signal from a credit card reader. Accordingly, when a push buttonof the keypad is pressed, a conventional low-band tone generator 130 generates an audio signal having a first predetermined frequency and a conventional high-band tone generator 132 generates an audio signal having a second predetermined frequency that is substantially higher than the first predetermined frequency. The combined outputs of the tone generators 130,132 are then applied directly to the transformer 102, which transmits them over the telephone line. The particular combination of low-frequency tones from generator 130 and high-frequency tones from generator 132 identifies which of the sixteen push buttons of keypad 20 is depressed, as is conventional in the telephone art.

As also mentioned above, the remote station 10 is adapted to read data recorded on a magnetic strip conventionally affixed to credit cards. Accordingly, the credit card C is inserted into the slot 24 (FIG. 1) of the control unit 12. As the credit card C is inserted in the slot 24, it closes a switch 136, which energizes a READ amplifier 138. As the card C is further inserted into the slot 24, the magnetic stripe passes along a READ head 140, which generates pulses corresponding to the information on the magnetic strip. These pulses, after being amplified by READ amplifier 138, are applied directly to the high-band tone generator through a diode 142. The high-band tone generator 132 then generates a relatively high-frequency audio tone indicative of a MARK signal.

The output of amplifier 138 is also applied to an invertor 144. In the event that the output of the amplifier 138 is a logic "0," invertor 144 outputs a high which actuates the low-band tone generator 130 through diode 146. Tone generator 130 then produces a relatively low-frequency audio signal indicative of a SPACE signal. At the same time, the low at the output of amplifier 138 prevents the high-band tone generator 132 from producing an output. Similarly, when the high-band tone generator 132 is producing an output, the resulting low at the output of inverter 144 prevents the low-band tone generator 130 from generating an audio output. The tone generators 130,132 thus generate an FSK signal indicative of the information on the magnetic stripe of the card C. These FSK signals are applied to the squaring amplifier 104 in the same manner as the FSK signals received from the host terminal.

Figure 3:
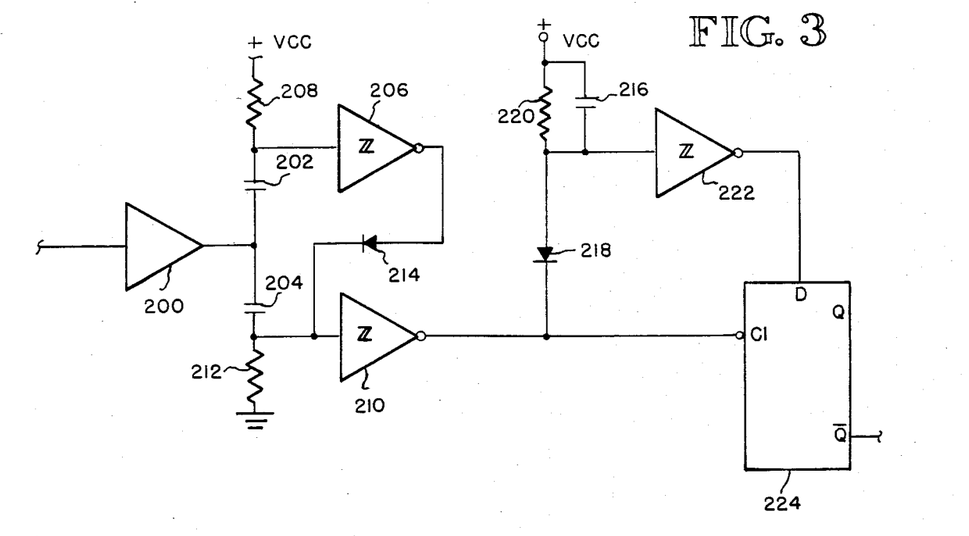
FIG. 3 is a schematic of the pulse width detector used in the remote terminal of FIG. 2.
Figure 4:
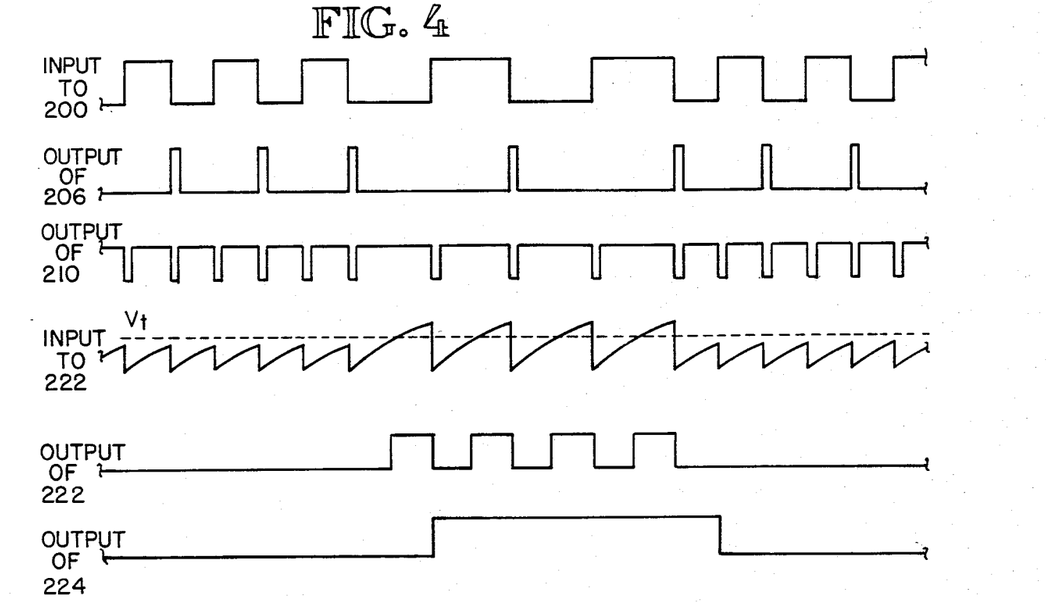
FIG. 4 is a timing diagram showing the signals at various points in the pulse width detector of FIG. 3.

All of the components of the remote station illustrated in FIG. 2, with the exception of the pulse-width detector 106, are conventional, commercially available items. The pulse-width detector 106 is illustrated in FIG. 3. The operation of the pulse-width detector of FIG. 3 is explained with reference to the timing diagram of FIG. 4. The square wave from amplifier 104 is received by an amplifier 200, which has its output connected to differentiating capacitors 202,204. The opposite plate of capacitor 202 is connected to the input of an inverting Schmidt trigger 206, which is normally held high through resistor 208. In a similar manner, the capacitor 204 is connected to the input of a second inverting Schmidt trigger 210, which is normally held low through resistor 212. A high-to-low transition of the input, as illustrated in FIG. 4, is differentiated by capacitor 202 and resistor 208 to generate a positive-going pulse at the output of Schmidt trigger 206, as illustrated in the second pulse train of FIG. 4. These positive-going pulses are applied through diode 214 to the input of Schmidt trigger 210. A low-to-high transition of the input, as illustrated in FIG. 4, is differentiated by capacitor 204 and resistor 212 to generate a negative-going pulse at the output of Schmidt trigger 210, as illustrated in the third pulse train of FIG. 4. A negative-going pulse is also generated at the output of Schmidt trigger 210 by the positive-going pulses at the output of Schmidt trigger 206. Thus, as illustrated in FIG. 4, a negative-going pulse is produced at the output of Schmidt trigger 210 on either a low-to-high or high-to-low transition of the input.

Each negative-going pulse at the output of Schmidt trigger 210 charges capacitor 216 through diode 218. Thereafter, capacitor 216 begins discharging through resistor 220. Thus, the input to Schmidt trigger 222 drops to zero during the negative-going pulse at the output of Schmidt trigger 210 and then begins discharging toward the supply voltage Vcc, as illustrated in the fourth wave form of FIG. 4. The time constant determined by resistor 220 and capacitor 216 is selected so that the capacitor 216 does not discharge to the threshold of Schmidt trigger 222 during the time interval between negative-going pulses at the output of Schmidt trigger 210 in the presence of a relatively high-frequency signal applied to amplifier 200. However, the substantially longer interval between negative-going pulses at the output of amplifier 200 responsive to a lower frequency signal being applied to its input allows the capacitor 216 to discharge so that the input to the Schmidt trigger 222 rises above its threshold voltage $V_t$. As a result, the output of Schmidt trigger 222 remains low as long as a relatively high-frequency signal is received by amplifier 200. However, positive-going pulses are produced at the output of Schmidt trigger 222 in the presence of a relatively low-frequency signal applied to amplifier 200. These positive-going pulses start at a predetermined time before the transition of the input signal and they terminate at the transition.

The output of the Schmidt trigger 222 is applied to the data input of a flip-flop 224, while the clock input of the flip-flop 224 receives the negative-going pulses at the output of Schmidt trigger 210. As illustrated in FIG. 4, Schmidt trigger 210 clocks a logic "0" into flip-flop 224 if the output of Schmidt trigger 222 is low at the transition of an input while clocking a logic "1" to the output of flip-flop 224 in the event that the output of Schmidt trigger 222 is high at the transition of the input. Flip-flop 224 thus generates a high one-half cycle after the input to the pulse-width detector 106 becomes a relatively low-frequency signal. The CPU 108 (FIG. 2) then decodes the output of the flip-flop 224, as discussed above.

Figure 5:
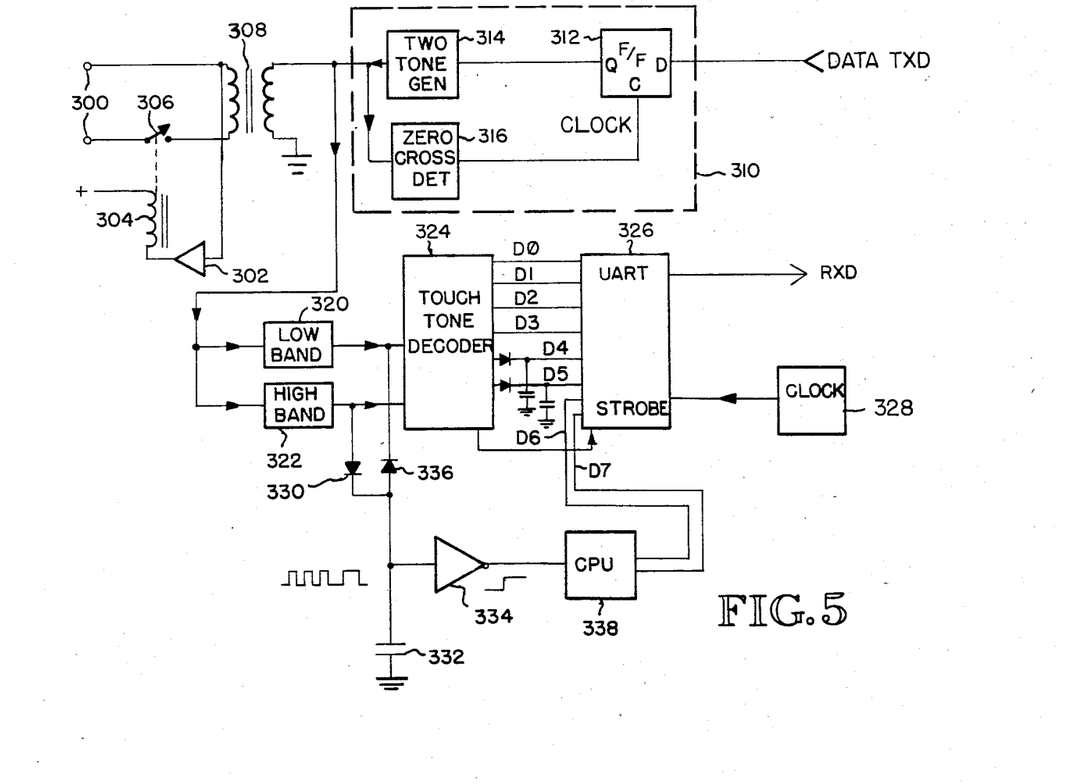
FIG. 5 is a schematic of the host terminal of the data communication system.

The host terminal, as illustrated in FIG. 5, is connected to telephone lines through terminals 300. The host terminal includes an auto-answering circuit since it is accessed by remote terminals at various times and must, therefore, respond thereto. When the host terminal is accessed, the RING signal on terminals 300 is applied to amplifier 302, which then generates an output that energizes relay coil 304. Relay coil 304 is of the self-latching variety so that, when energized, it closes contact 306 and maintains contact 306 closed. The telephone lines are then connected to transformer 308. As mentioned above, the host terminal both transmits and receives data. In the transmission mode, data is applied to a modulator 310 from an external device, which will normally be a computer. The purpose of the modulator is to generate an FSK signal indicative of the two input levels. However, the modulator 310 must transition from one signal frequency to the other in manner which does not generate high-frequency harmonics on the telephone lines. In other words, a sudden transition from a high-frequency sine wave at the 90° phase point to a low-frequency sine wave at the 0° phase would generate a large number of harmonics. The modulator 310 solves this problem by switching from one signal frequency to the other only at the zero crossing of the audio signal. Accordingly, the digital data is applied to a flip-flop 312. The flip-flop 312 applies the digital data to a two-tone generator 314, but only when a clock pulse is generated by a zero-crossing detector 316. Zero-crossing detector 316 generates a clock pulse each time the audio output of the two-tone generator 314 passes through the 0° and 180° phase points. For example, if the digital data input switches states when the output of the two-tone generator 314 is at phase 270°, the change in state will not be applied to the two-tone generator 314 until the 360° point when the zero-crossing detector 316 generates a clock pulse. The modulator 310 thus generates an audio tone at one of two frequencies and switches from one frequency to the other only at the zero-crossing point. The FSK signals at the output of the two-tone generator 314 are applied to the telephone lines through transformer 308.

FSK and two-tone signals applied to the host terminal are coupled through the transformer 308 and applied to the low-band and high-band tone filters 320,322, respectively. The tone filters 320,322 are connected to two discrete decoder circuits, one of which decodes two-tone input signals while the other decodes FSK signals. Conventional two-tone signals are decoded by a conventional TOUCH-TONE decoder 324 which generates a four-bit output identifying which of the sixteen push buttons of the key pad 20 have been depressed. This four-bit byte is applied to a conventional parallel-to-serial converter 326, which generates a serial data stream at a frequency determined by clock 328, corresponding to the four-bit data byte. This digital data stream is normally applied to the same computer that generates the digital data received by the modulator 310.

In the event that FSK signals are being received by the host station, an audio signal will be generated at the output of either the low-band filter 320 or the high-band 322, depending upon the frequency of the FSK signal. A high-frequency signal is rectified by diode 330 and filtered by capacitor 332 to apply a positive DC voltage to inverter 334. Inverter 334 then generates a low, logic "0" output. A low-frequency audio signal at the output of tone filter 320 is rectified by diode 336 and filtered by capacitor 332 to apply a negative input to inverter 334. Inverter 334 then generates a high or logic "1" output.

The decoded FSK signals at the output of inverter 334 are applied to a central processing unit 338, which generates data inputs to the parallel-to-serial converter 326. The parallel-to-serial converter 326 then generates a serial data stream indicative of the FSK information.

Figure 6:
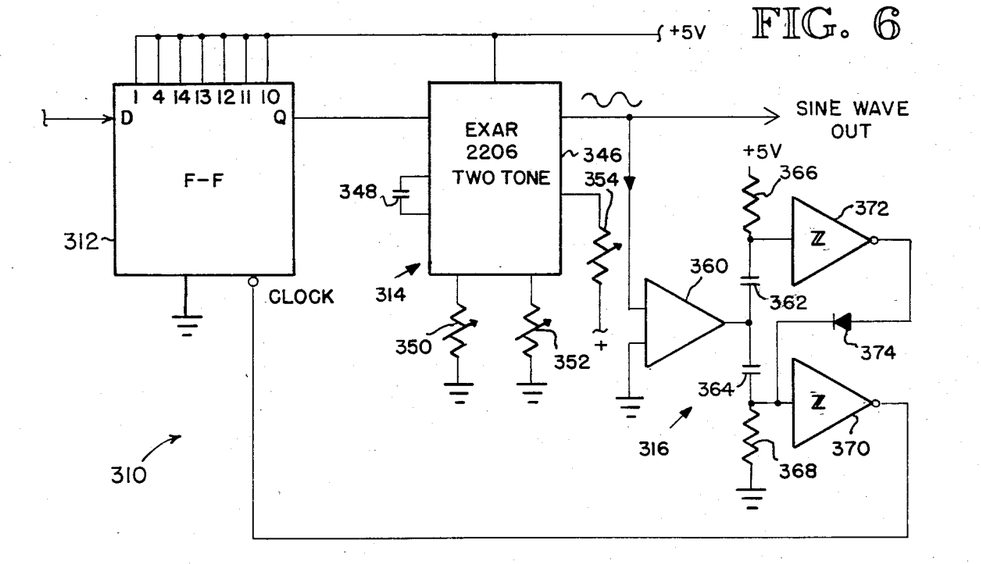
FIG. 6 is a schematic of the modulator used in the host terminal of FIG. 5.

All of the components of the host system, illustrated in FIG. 5, are conventional, commercially available elements, except for the modulator 310. The modulator 310 is illustrated in FIG. 6 and explained with reference to the timing diagram in FIG. 7. The two-tone generator 314 is a commercially available item that generates a sine wave of a first relatively high frequency, depending upon the values of capacitor 348 and potentiometer 350 when the control input is low. The tone generator 346 generates a sine wave having a relatively low frequency, as determined by the values of capacitor 348 and potentiometer 352 when the control input to generator 346 is high. The amplitude of the signal at the output of the tone generator 346 is determined by the value of potentiometer 354.

The output of the tone generator 346 is applied to the transformer 308 (FIG. 5) as well as to amplifier 360. The output of amplifier 360 is differentiated by capacitors 362,364 in combination with resistors 366,368. The low-to-high transitions at the output of amplifier 360 are differentiated by capacitor 364 and resistor 368 to generate a positive-going pulse which is applied to inverting Schmidt trigger 370. The high-to-low transitions of the output of amplifier 360 are differentiated by capacitor 362 and resistor 366 to cause inverting Schmidt trigger 372 to generate positive-going pulses. These positive-going pulses are applied through diode 274 to the input of Schmidt trigger 370. Schmidt trigger 370 thus generates a negative-going pulse for each transition of the signal at the output of the amplifier 360. These pulses clock the logic level at the input of flip-flop 312 to its Q output.

Figure 7:
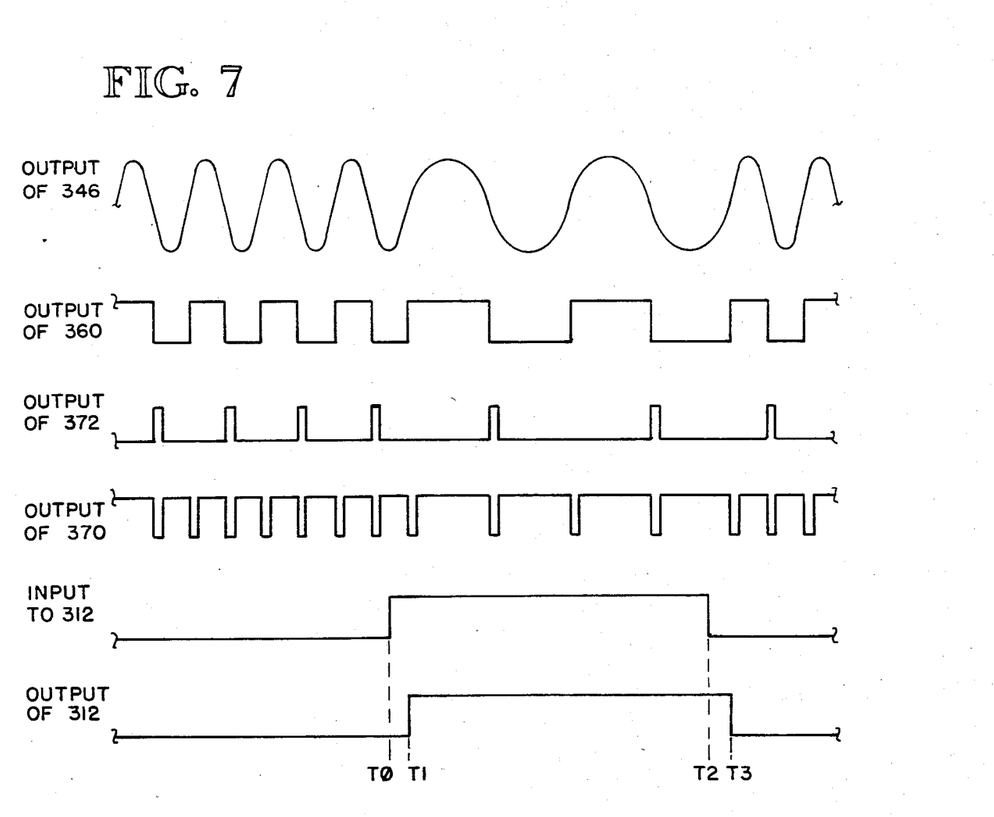
FIG. 7 is a timing diagram showing the signals at various points in the modulator of FIG. 6.

Assuming that the tone generator 346 is producing a relatively high-frequency sine wave, as illustrated at the left-hand side of FIG. 7, the square wave generated at the output of amplifier 360 will be as illustrated by the second wave form of FIG. 7. As illustrated in the third wave form of FIG. 7, Schmidt trigger 372 generates a positive-going pulse at each high-to-low transition of the signal at output of amplifier 360. These positive-going pulses cause Schmidt trigger 370 to generate a negative-going pulse, and the Schmidt trigger 370 also generates negative-going pulses at the low-to-high transition of the signal at the output of amplifier 360, as illustrated in the fourth wave form of FIG. 7. The negative-going pulses at the output of Schmidt trigger 370 clock the input of flip-flop 312 to its output. However, since the input is low, the output of flip-flop 312 remains low, thereby causing the tone generator 346 to continuously generate the relatively high-frequency sine wave. The circuit remains in this state until the input to the modulator 310 changes.

It will be noted from the timing diagram of FIG. 7 that the input to flip-flop 312 goes high at time $T_0$, which is at the 270° phase point of the sine wave at the output of tone generator 346. If the input were applied directly to the tone generator 346, its output would immediately jump to the 0° phase point of the relatively low-frequency sine wave. This situation would create high-frequency harmonics which would be applied to the telephone lines. To prevent these high-frequency harmonics from being generated, the output of flip-flop 312 does not change until the high at its input is clocked to its output by the pulse occurring at $T_1$ when the sine wave output of the tone generator 346 reaches the 360° point. It is at this point, $T_1$, that the tone generator 346 switches from the high frequency to the low frequency sine wave. Similarly, when the input goes high to low, at time $T_2$, the input to the tone generator 346 does not change until flip-flop 312 is pulsed at $T_3$ by the pulse occurring at the 360° point of the sine wave from the tone generator 346.

Figure 8:
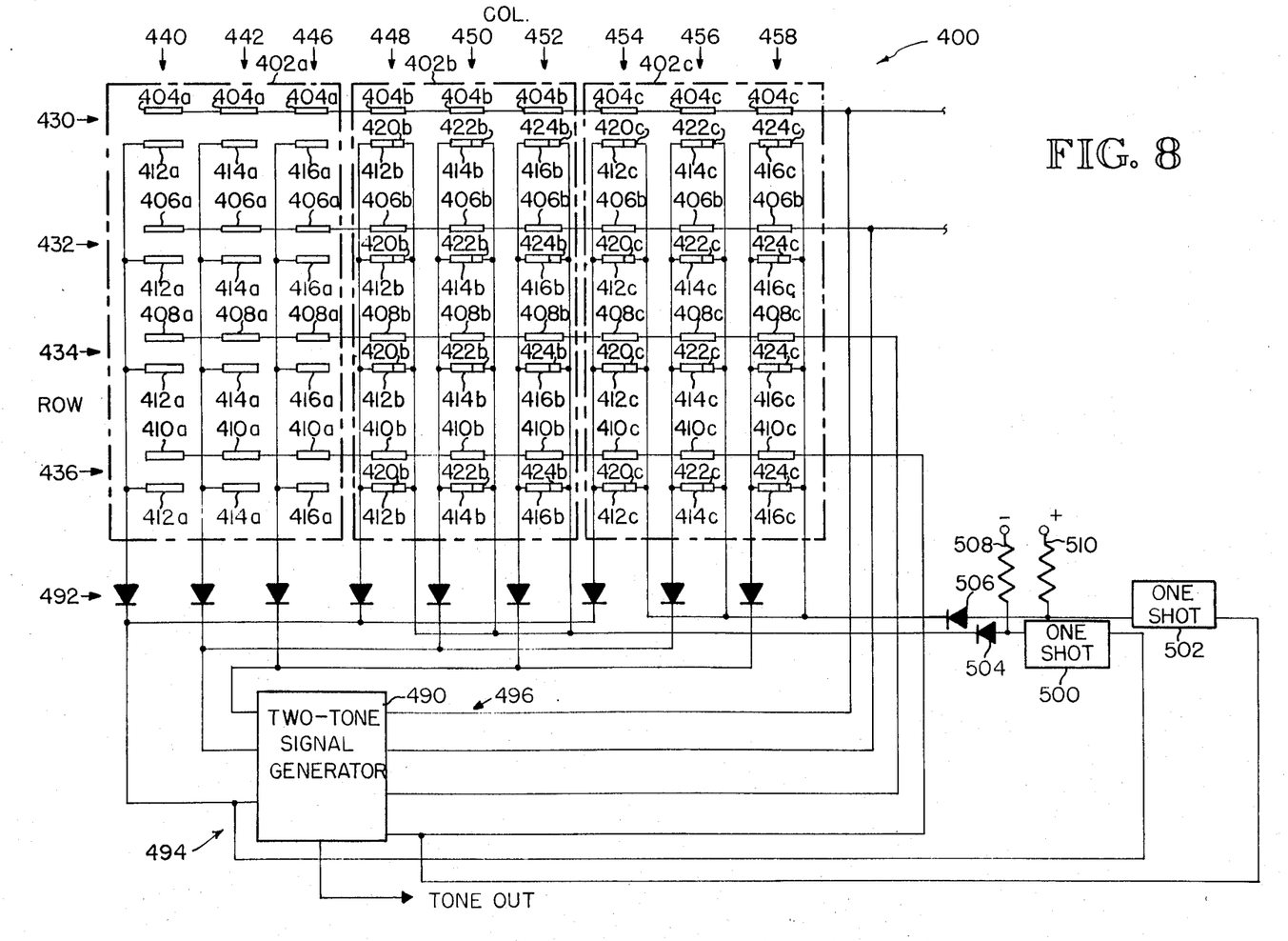
FIG. 8 is a schematic of a forty-eight-key keypad fabricated by combining three conventional two-tone keypads and a conventional twelve-key two-tone generator.
Figure 9:
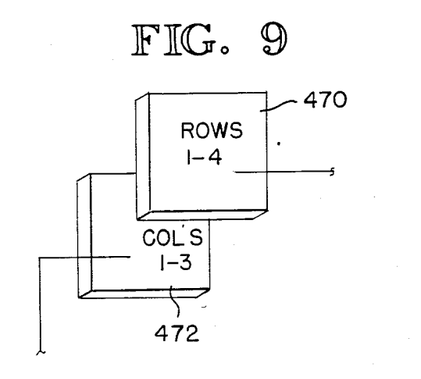
FIG. 9 is a schematic of a portion of one type of switch used with the keypad of FIG. 8.
Figure 10:
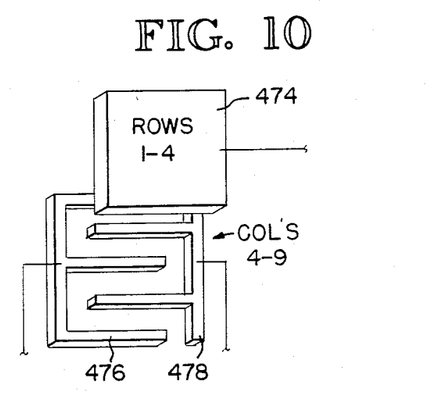
FIG. 10 is a schematic of a portion of another type of switch used with the keypad of FIG. 8.

The remote terminal of the data communication system illustrated in FIG. 1 utilizes a sixteen-key keypad. As a result, the keypad is not capable of transmitting alphanumeric data. In order to allow the remote terminal to send alphanumeric data, the keypads of FIG. 8 may be used. The keypad of FIG. 8 includes three two-tone keypads 402a,b,c, each of which includes four rows and three columns of keys. Thus, the entire keypad 400 includes four rows of keys 430,432,434,436, respectively, and nine columns of keys 440,442,446,448,450,452,454,456,458, respectively. Although the keys may actuate switches of various designs, a schematic of one type of switch for the first keypad 402a is illustrated in FIG. 9. The row contacts 404a,406a,408a,410a, as well as the column contacts, 412a, 414a,416a, may be simply conductive plates 470,472 which are normally spaced apart from each other. Pressing the key forces the plate 470 against the plate 472, thereby completing a circuit from one of the row contacts to one of the column contacts. In contrast, the switches for the second and third keypads 402b, 402c may be as illustrated in FIG. 10. These switches utilize row contacts 404b–410c that are, like the row contacts 404a–410a of the first keypad 402a, conductive plates 474. However, the column contacts 412b–416c are formed by a fork-shaped conductor 476 which fits into a second fork-shaped conductor 478. Thus, pressing the keys of the keypads 402b, c not only places the plate 474 in contact with conductor 476, but it also provides contact between conductor 478 and conductor 476 and plate 474.

Returning now to FIG. 8, the keyboard 400 is connected to a conventional two-tone signal generator 490 through isolation diodes 492. The signal generator 490 includes three column inputs 494 and four row inputs 496. An input applied to any of the column inputs 494 causes the signal generator to generate a tone in one frequency band. Similarly, an input applied to any of the row inputs 496 causes the signal generator 490 to generate a tone in a different frequency band. Signals applied to both a column input 494 and a row input 496 cause the signal generator to simultaneously generate two different frequency tones. The row contacts 404a–410c in the same row are connected to each other and to one of the row inputs 496. Thus, for example, all of the row contacts 406a,b,c in row 432 are connected to each other and to the second of the row inputs 496. Similarly, all of the column contacts 412a–416c in the same column are connected to each other and to one of the three column inputs 494. Thus, all of the column contacts 414a are connected to each other and to the second of the column inputs 494 to the signal generator 490. It will be noted that each column input 494 is connected to one column of column contacts in each keypad 402a–402c. Thus, the column contacts 412a–416c are arranged in three groups corresponding to the keypads 402a–402c. Consequently, pressing a key in a given column in any keypad 402a–402c will apply a signal to the same column input 494 regardless of which keypad 402a–402c the column is in. Thus, combining several keypads 402a–402c, each having a number of columns equal to the number of column inputs in the signal generator 490, requires that some circuitry be provided for identifying which keypad is being actuated. Accordingly, the second and third keypads 402b, 402c, respectively, are provided with the third contact 420b–424c described above. All of the band-identifying contacts 420b–424b and 420c–424c in the same keypad 420b,c, respectively, are connected to each other and to a respective one-shot 500,502 through respective diodes 504, 506. The anodes of the diodes 504,506 are normally held high through pull-up resistors 508,510, respectively. Pressing any of the keys in the first keypad 402a applies signals to the column input 494 and row inputs 496, which uniquely identify the key. Pressing any of the keys in the second keypad 402b also causes signals to be applied to a column input 494 in a row input 496. However, the connection between the band-identifying contact 420b–424b and the row contact 404b–410b causes the input of one-shot 500 to be pulled low through diode 504. When the key is released, the low-to-high transition at the input of one-shot 400 applies an actuating signal to one of the column inputs 494, thereby causing the signal generator to generate a tone for a predetermined period. Similarly, when any of the keys in the third keypad 402c is pressed, the signal generator 490 generates two tones having different frequencies. When the key is released, the low-to-high transition at the input of one-shot 502 causes the one-shot 502 to apply an actuating signal to one of the row inputs 496. The signal generator 490 then generates a tone in the row input frequency band for a predetermined period. In summary, pressing a key located in corresponding positions of each keypad 402a–402c causes the signal generator 490 to generate the same two tones for as long as the key is pressed. The position of the key in any of the keypads 402a''402c is identified by the particular combination of tones. When the key is released, the output of the signal generator 490 identifies in which of the keypads 402a–402c the pressed key is located. The lack of any output from signal generator 490 when the key is released indicates that the pressed key is in keypad 402a. A signal from signal generator 490 in the column input frequency band indicates that the key is in the keypad 402b. Finally, a signal from signal generator 490 in the row input frequency band indicates that the key is located in the third kepyad 402c.

Figure 11:
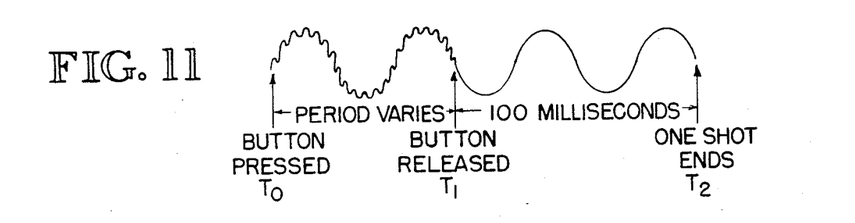
FIG. 11 shows a typical waveform generated by the signal generator of the keypad of FIG. 8.

A typical waveform generated by the signal generator 490 is illustrated in FIG. 11. At $T_0$, the button is pressed, thereby causing the signal generator to produce a relatively low-frequency signal identifying the column input that is actuated and a signal having a substantially higher frequency identifying the row column input that is actuated. When the key is released at $T_1$, the key tone signals terminate, and a third signal, identifying the keypad in which the key is located, is generated for a predetermined period terminating at $T_2$.

Figure 12:
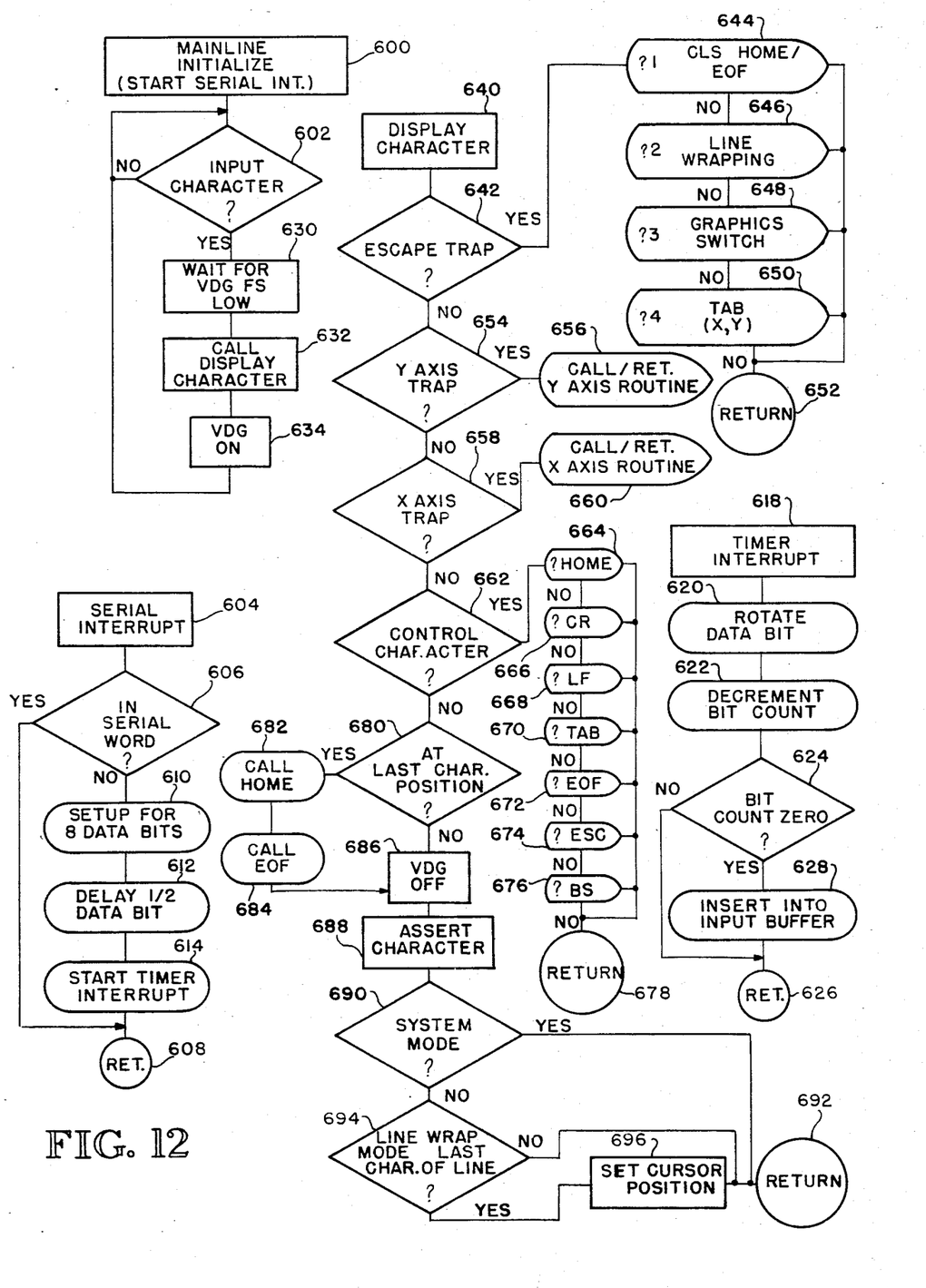
FIG. 12 is a flow chart of the software for controlling the operation of the microprocessor used in the remote terminals of FIGS. 1 and 2.

The software for controlling the operation of the CPU 108 of the remote terminal (FIG. 2) is illustrated in flow chart form in FIG. 12. Upon "power up," the CPU is initialized at 600, where a serial interrupt subroutine (described hereinafter) is activated and various buffers and flags are set up. The program then checks for the presence of eight bits of data identifying a character in an input buffer at 602. At "power up", no data has been received from the host terminal and the input buffer thus does not contain a character. Consequently, the program stays in a loop at 602.

The input buffer is filled by the serial interrupt subroutine mentioned above. The data from the pulse-width detector 106 (FIG. 2) is applied to the CPU 108 through the interrupt input. The serial interrupt subroutine is thus entered at 604 by a low-to-high transition at the interrupt input of the CPU 108. The subroutine then checks at 606 to determine if the low-to-high transition is the start of a character word or is a low-to-high transition in the middle of a character word. If the low-to-high transition is not the START bit of the character word, the program returns to the main program via 608. If the low-to-high transition is determined at 606 to be a part of the START bit, an internal counter is preset to 8 at 610 in order to count each bit of the eight-bit character word as it is received. A delay for one-half of the data bit is set up at 612 so that the status of the interrupt input will be checked at the middle of each bit in order to determine whether the data bit is a logic "0" or logic "1." Finally, a timer-interrupt subroutine is started at 614.

The timer-interrupt subroutine examines the status of the interrupt input during the middle of each data bit and shifts the data into the input buffer. The subroutine is entered at 618 and it first shifts the logic level at the interrupt input into a shift register at 620. The bit counter that was preset to 8 at 610 is then decremented at 622 so that the CONTENTS of the counter indicates the number of bits to be received before the input buffer is filled. The status of the bit counter is examined at 624, and if the count is not zero, the subroutine returns to the main program via 626. Thereafter, of course, the program remains in the loop at 602 since the input buffer is not yet full. Upon the next low-to-high transition of the next data bit, the serial interrupt subroutine detects that the input is in the middle of a serial word at 606 and returns via 608. However, during this time, the timer-interrupt subroutine continues to run, thereby shifting this next data bit into the shift register at 620 and decrementing the bit counter at 622. Finally, when all eight bits of the character have been shifted into the shift register, the zero count in the bit counter is detected at 624 and the contents of the shift register is inserted into the input buffer at 628.

When the main program next examines the contents of the input buffer at 602, the program steps to 630, where it waits for the FS output of the video display generator 120 (FIG. 2) to go low. The FS output goes low during the retrace of the picture appearing on the screen of the television 16. During this retrace period, the internal memory of the video display generator 120 is not being accessed by the video signal generator and data may thus be written into the memory during this period. When the FS output goes low, a display character subroutine is called at 632. The display character subroutine, as described in greater detail below, adapts the remote terminal to specific operating conditions of the host terminal, it implements certain control characters, and it writes displayed characters into the memory of the video display generator 120. After a return from the called display character subroutine, the video display generator 120 is turned on at 634 and the program then waits at 602 until the input buffer has once again been filled with the next character from the host terminal.

The display subroutine is entered at 640, and it first senses for the presence of an escape character at 642. An escape character adapts the software of the remote terminal to the operating characteristics of the host terminal. Certain operating conditions are automatically established during initialization at 600 upon "power up." For example, the screen of the television set 16 is cleared by the host terminal's sending a "HOME" character followed by an erase-end-of-frame "EOF" character. This operating characteristic is maintained for host terminals which are programmed to operate by clearing the screen of a remote terminal in this manner. However, some host terminals perform the screen-clearing function by sending a clear screen "CLS" signal. The remote terminal can be adapted to operate with such host terminals if the host terminal first sends an "ESC-1" character. The ESC-1 character then sets a flag at 644 so that the host terminal will thereafter clear the screen of the television set 16 upon receipt of a CLS character.

In a similar manner, an "ESC-2" character causes the remote terminal to delete its line-wrapping function. The remote terminal is automatically programmed with an auto-wraparound feature in which a line feed and carriage return are automatically generated when the remote terminal receives a character while the cursor is positioned at the thirty-second character of a line. However, some host terminals are not adapted to operate with remote terminals having an auto-wraparound feature. Instead, these terminals must send line feed and carriage return characters, or else characters received after the thirty-second character in a line are automatically written on top of each other. The remote terminal can be adapted to operate with host terminals not designed for communicating with remote terminals having line wrapping by generating the ESC-2 signal, which is detected at 646.

The host terminal may also send a "ESC-3" character, which closes a graphic switch at 648. Terminals operate in two modes, namely, the alphanumeric mode and the graphic mode. In the graphic mode, graphics such as bar graphs, charts, etc., may be generated. This mode is no normally used in the system described herein, so, upon "power up," the graphic switch is left off during the initialization at 600. However, the remote terminal may receive graphics upon receipt of the ESC-3 character from the host terminal.

Finally, the host terminal can send an "ESC-4" signal to change the "tab" function of the remote terminal so that it designates the X—Y coordinates of the cursor instead of acting as a tabulator. The ESC-4 character is detected at 650. Thus the display character subroutine entered at 640 first senses for the presence of an escape character at 642 and then identifies the escape character between 644-650 before returning to the main program via 652. Identification of the escape character in steps 644-650 modifies the operation of the remote terminal in accordance with the operating characteristics of the host terminal.

If the character received by the remote terminal is not an escape character, this fact is detected at 642, causing the program to progress to 654. At 654, the receipt of a Y-axis designation is detected. The Y-axis character is designated by the host terminal's sending a TAB character (assuming the ESC-4 character has previously been sent). Thereafter, the next two numbers following the TAB character are stored as the X and Y coordinates of the cursor. Thus receipt of a TAB character is detected at 654, and the number following is detected at 654 and stored through a Y-axis subroutine at 656. In a similar manner, the following number is detected at 658 and stored as the X-axis coordinate at 660 through an X-axis subroutine.

If the character received by the remote terminal is neither an escape character nor a TAB designation of X and Y coordinates, it may be either a control character (which performs certain operating functions) or a display character that is displayed on the screen of the television 16. A control character is detected at 662 and the identity of the control character is sequentially tested from 664 through 676 before returning to the main program through 678. Thus, the HOME character is detected at 664 to return the cursor to the 0,0 coordinate on the screen. The carriage return "CR" character is detected at 666 to return the cursor to the left-hand side of the screen. The line feed "LF" character is detected at 668 to move the cursor down one line on the screen. The TAB character is detected at 670 to either designate X and Y coordinates (if the ESC-4 character has previously been sent) or to cause the cursor to tabulate across a line to the next tabulator stop. The erase-end-of-frane "EOF" character is detected at 672 to erase the entire screen from the location of the cursor onward. The presence of an escape character is detected at 674 in case an escape character other than ESC-1 through ESC-4 has been received. Other escape characters can modify the operation of the remote terminal in the same manner that the operation has been modified through receipt of the other escape characters discussed above. Finally, the backspace "BS" character is detected at 676 to move the cursor on the television screen one position to the left.

If the received character is not determined at 662 to be a control character, then it must be a display character that should be displayed on the screen. The position at which the character is to be displayed is determined at 680. If the previously received display character is at the thirty-second position of a line, the HOME character is automatically generated at 682 to return the cursor to the 0,0 position and the erase-end-of-frame "EOF" is automatically generated at 684 to erase the entire screen from the 0,0 cursor position to the end of the screen. Thereafter, the video display generator 120 is turned off at 682 to gain access to the memory in the video display generator. It will be understood that the entire display character subroutine is performed during the time that the FS output of the video display generator is low during the flyback or retrace of the screen of the television 16. Consequently, the video display generator 120 can be turned off at 686 without producing any interference or effect on the television 16. The display character is then asserted or written into the memory of the video display generator 120 at 688. This is accomplished by the central processing unit 108 generating an eight-bit byte indicative of the character on its data bus and an address on its address bus designating the storage location of the character.

As explained above, the characters that are displayed on the screen of the television 16 are normally characters sent by the host terminal. However, at "power up," the remote terminal internally generates characters on the screen which instruct the operator how to access the host terminal and to provide other information. This operating mode, termed the "system mode," is detected at 690. In the system mode, in which the characters are internally generated, it is more efficient to avoid using the automatic line wrap feature. Consequently, when the system mode is detected at 690, the line wrap function is bypassed by returning to the main program directly via 692. When the remote terminal receives characters from the host terminal, the display character subroutine is routed from 690 through 694, where the last character of a line is detected (assuming that the line wrap feature has not been disabled by an ESC-2 character). If the previous character is the last character of a line, the cursor position is set to the first character position at 696 before returning to the main program. Otherwise, if the previous character is not positioned at the thirty-second position, the set cursor position step at 696 is bypassed to return directly through 692.

Figure 13:
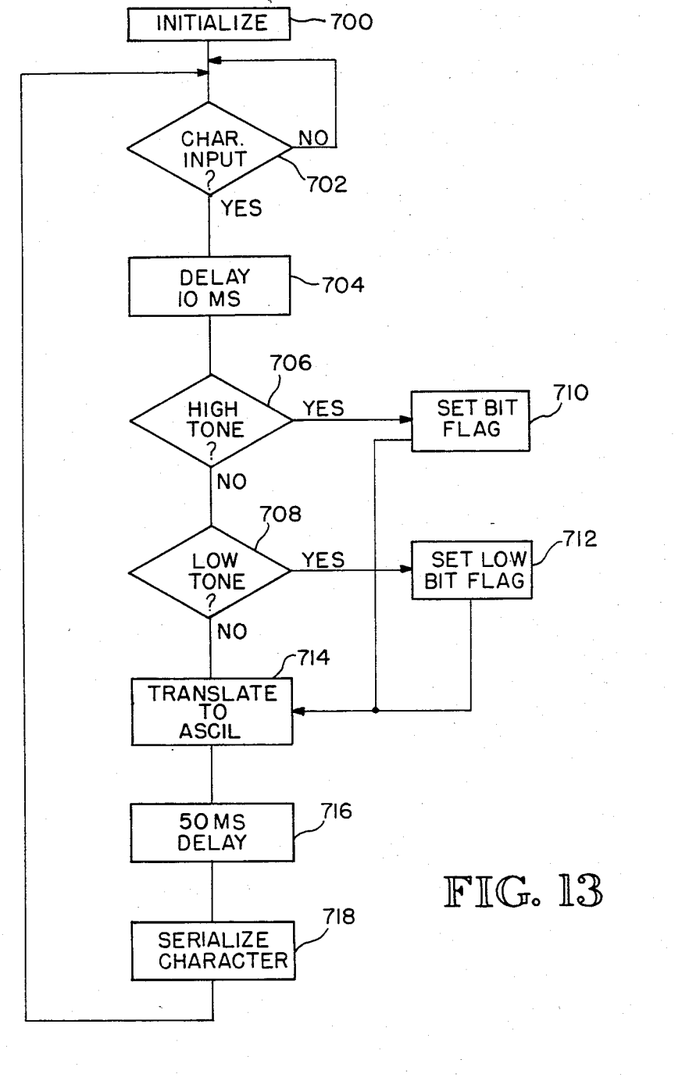
FIG. 13 is a flow chart of the software for controlling the operation of the microprocessor used in the host terminal of FIG. 5.

The software for controlling the operation of the central processing unit 338 in the host terminal (FIG. 5) is substantially less complex than the software for the remote terminal. As illustrated in FIG. 13, the CPU 338 is initialized at 700 upon "power up" by setting up various flags and pointers and clearing buffers. The presence of a character from the remote terminal is tested at 702. The program remains in a loop at 702 until an FSK signal is received from the remote terminal, at which time the program progresses to 704, where a short delay is implemented. This delay provides a debouncing function and ensures that the received signal is valid. Thereafter, the program detects for the signal being in a high band at 706 or in a low band at 708 and sets a flag in respective register 710,712 accordingly. The flags set at 710,712 are then translated to an ASCII character at 714 through an internal look-up table. A 50-millisecond delay is then implemented at 716 to inhibit the system from responding to echoes of the transmitted signal. Finally, the bits of the character corresponding to the received character are output in serial form at 718.

We claim:

1. A system for communicating over a telephone line between a host station and one of a plurality of remote stations, said system comprising:
   a remote terminal connected to said telephone line at said remote station, said remote terminal including frequency-shift-keyed decoder means connected to said telephone line for generating a data signal corresponding to a frequency-shift-keyed signal received from said telephone line, a visual display generator producing a visual signal corresponding to a visual representation that displays information received in the form of said frequency-shift-keyed signal and visual display means for receiving said visual signal and displaying said visual representation, said remote terminal further including a keypad having a plurality of keys and a two-tone signal generator connected to said telephone line for applying to said telephone line pairs of tones, each uniquely corresponding to one of said keys, card reader means for generating a digital signal indicative of information recorded on a card adapted for insertion in said card reader means, and a frequency-shift-keyed modulator connected to said card reader means and said telephone line applying a frequency-shift-keyed signal to said telephone line corresponding to the digital signal received from said card reader means; and
   a host terminal connected to said telephone line at said host station, said host terminal including a frequency-shift-keyed modulator connected to said telephone line applying a frequency-shift-keyed signal to said telephone line corresponding to a data signal received from an external source and a two-tone decoder connected to said telephone line, said decoder generator a data byte identifying the tone pair being received, said host terminal further including a frequency-shift-keyed decoder connected to said telephone line generating a digital signal corresponding to the frequency-shift-keyed signal received from said remote terminal, thereby identifying the information recorded on said card.

2. The system of claim 1 wherein said host terminal further includes a parallel-to-serial converter receiving the output of said two-tone decoder and generating a stream of serial data corresponding thereto which is adapted to be applied to an external device.

3. The system of claim 1 wherein the frequency-shift-keyed modulator connected to said card reader means comprises a conventional two-tone generator having a low-frequency signal generator producing one of a plurality of relatively low-frequency signals and a high-frequency signal generator producing one of a plurality of relatively high-frequency signals, said low-frequency generator producing one of said low-frequency signals in response to one level of said digital signal and said high-frequency generator producing one of said high-frequency signals in response to the other level of said digital signal.

4. The system of claim 3 wherein the frequency-shift-keyed decoder in said host terminal which decodes said frequency-shift-keyed signals comprise a high-frequency filter having a center frequency selected to attenuate said relatively low-frequency signal relative to said relatively high-frequency signal, a low-frequency filter having a center frequency selected to attenuate said relatively high-frequency signal relative to said relatively low-frequency signal, first rectifier means connected to said high-frequency filter for generating a first rectified signal of one polarity in proportion to the magnitude of the signal at the output of said high-frequency filter, second rectifier means connected to said low-frequency filter for generating a second rectified signal of the opposite polarity in proportion to the magnitude of the signal at the output of said low-frequency filter, said first and second rectified signals being applied to a common terminal to generate on said terminal a signal indicative of said frequency-shift-keyed signal.

5. The system of claim 1 wherein the frequency-shift-keyed modulator of said host terminal comprises:

a two-tone signal generator adapted to apply a signal of one of two frequencies to said telephone line, depending upon the amplitude of a signal applied to its input, zero-crossing detector means receiving the output of said two-tone signal generator for generating a pulse responsive to each time the output of said two-tone signal generator crosses through zero volts, and a flip-flop having a data input receiving data from said external source, a clock input connected to the output of said zero-crossing detector and an output connected to the input of said two-tone signal generator such that the output of said two-tone generator switches from a signal of one frequency to a signal of the other frequency only when the signal at the output of said two-tone generator passes through zero volts.

6. The system of claim 1 wherein the frequency-shift-keyed signal generated by said host terminal is a serial stream of data in non-return-to-zero form preceded by a START bit and followed by a STOP bit, and wherein said remote terminal further includes timer means actuated by said START bit and sampling the data signal generated by said frequency-shift-keyed decoder means at multiples of a predetermined period responsive to said START bit, said predetermined period corresponding to the duration of each bit of said serial stream of data.

7. The system of claim 1 wherein the frequency shift signal generated by said remote terminal is a serial stream of data in non-return-to-zero form preceded by a START bit and followed by a STOP bit, and wherein said host terminal further includes timer means actuated by said START bit and sampling the data signal generated by said frequency-shift-keyed decoder means at multiples of a predetermined period responsive to receipt of said START bit, said predetermined period corresponding to the duration of each bit of said data stream.

8. The system of claim 1 wherein said keypad comprises:

two-tone signal generator means having M row inputs and N column inputs, said signal generator means generating respective unique pairs of audio tones responsive to actuating signals applied to combinations of said row and column inputs whereby said signal generator means is capable of generating the product M and N unique pairs of tones;

a plurality of switches, each corresponding to a key of said keypad and containing row and column contacts generating said actuating signals responsive to depression of said key, said keys being arranged in X rows and Y columns, with the product of X and Y being greater than the product of M and N, said columns being arranged in at least Y/N groups, with the switches of at least Y/N−1 of said groups containing a band-identifying contact that generates a trigger signal responsive to release of the respective key;

first interconnecting means connecting the row contacts of the switches in each row to each other and to a respective row input of said signal generator means;

second interconnecting means interconnecting the column contacts of the switches in each column in each group to each other and to a respective column input of said signal generator means so that at least one of said column inputs is connected to the column contacts of switches in different groups of columns;

at least Y/N−1 timer means, each having an input connected to a respective band-identifying contact and an output connected to a respective input of said signal generator means for causing said signal generator means to generate a band-identifying signal of a predetermined duration responsive to receipt of the trigger signal from the band-identifying contact of the key in the corresponding group of columns so that said band-identifying signal is produced immediately following the two-tone signal corresponding to said key, thereby uniquely identifying the row and column of said key.

9. The system of claim 8 wherein said signal generator means is a conventional TOUCH-TONE signal generator having four row inputs and three column inputs and wherein said keypad is composed of at least four rows and four columns of keys, with all columns in excess of three arranged in groups of three and every key in each group including interconnected band-identifying contacts connected to the inputs of respective timer means.

10. The system of claim 1 wherein said digital signal includes binary data recorded on said card, and said frequency-shift-keyed modulator connected to said card reader means receives said digital signal and generates said frequency-shift-keyed signal applied to said telephone line with a high-frequency audio signal corresponding to a bit at one logic state of said data signal and a low-frequency audio signal corresponding to a bit at another logic state of said data signal.

11. The system of claim 1 wherein said visual display generator is a video display generator, said visual signal is a video signal, said visual representation is a video picture and said visual display means includes an RF modulator with a modulation input receiving said video signal for generating a RF signal and a TV receiver receiving said RF signal.

12. The system of claim 1 wherein said frequency-shift-keyed decoder means in said remote terminal includes a pulse width detector for receiving from said telephone line said frequency-shift-keyed signal, said received frequency-shift-keyed signal including a high-frequency signal corresponding to a bit at one logic state of said data signal received by said host terminal and a low-frequency signal corresponding to a bit at another logic state of said data signal received by said host terminal.

13. A system for communicating over a telephone line between a host station and one of a plurality of remote stations, said system comprising:

a remote terminal connected to said telephone line at said remote station, said remote terminal including frequency-shift-keyed decoder means connected to said telephone line for generating a data signal corresponding to a frequency-shift-keyed signal received from said telephone line, a visual display generator producing a visual signal corresponding to a visual representation that displays information received in the form of said frequency-shift-keyed signal and visual display means for receiving said visual signal and displaying said visual representation, said remote terminal further including a keypad having a plurality of keys and a two-tone signal generator connected to said telephone line for applying to said telephone line pairs of tones, each uniquely corresponding to one of said keys, said frequency-shift-keyed signal received by said remote terminal from said telephone lines has a high-frequency signal corresponding to a bit at one logic state of said data signal received by said host terminal and a low-frequency signal corresponding to a bit at another logic state of said data signal received by said host terminal, and said frequency-shift decoder means in said remote terminal includes squaring means for producing a substantially square wave in received frequency-shift-keyed signal, said square wave having transitions substantially corresponding to the zero-crossing of said received frequency-shift-keyed signal, a first differentiator for differentiating high-to-low transitions of said square wave and generating a first transition indicator signal, a second differentiator for differentiating low-to-high transitions of said square wave and generating a second transition indicator signal, a frequency detector for measuring the time interval between successive signals of said first and second transition indicator signals, and comparing said measured interval to a predetermined time constant to determine if said measured interval corresponds to said high-frequency or low-frequency signal, said frequency detector generating a frequency indicator signal, and a flip-flop having a data input receiving said frequency indicator signal and a clock input receiving said first and second transition signals for generating an output data signal corresponding to said data signal received by said host terminal from an external source; and a host terminal connected to said telephone line at said host station, said host terminal including a frequency-shift-keyed modulator connector to said telephone line applying a frequency-shift-keyed signal to said line corresponding to a data signal received from an external source and a two-tone decoder connected to said telephone line, said decoder generating a data byte identifying the tone pair being received.

14. A system for communicating over a telephone line between a host station and one of a plurality of remote stations, said system comprising:

a remote terminal connected to said telephone line at said remote station, said remote terminal including frequency-shift-keyed decoder means connected to said telephone line for generating a data signal corresponding to a frequency-shift-keyed signal received from said telephone line, a visual display generator producing a visual signal corresponding to a visual representation that displays information received in the form of said frequency-shift-keyed signal and visual display means for receiving said visual signal and displaying said visual representation, said remote terminal further including a keypad having a plurality of keys and a two-tone signal generator connected to said telephone line for applying to said telephone line pairs of tones, each uniquely corresponding to one of said keys, said frequency-shift-keyed signal received by said remote terminal from said telephone line has a high-frequency signal corresponding to a bit at one logic state of said data signal received by said host terminal and a low-frequency signal corresponding to a bit at another logic state of said data signal received by said host terminal, and said frequency-shift decoder means in said remote terminal includes zero-crossing detector means for detecting zero-crossings of said received frequency-shift-keyed signal and generating a zero-crossing indicator signal, frequency detector means responsible to said zero-crossing indicator signal for detecting said high-frequency and low-frequency signals of said frequency-shift-keyed signal, and generating a frequency indicator signal, and pulse generator means responsible to said zero-crossing indicator signal and said frequency indicator signal for generating an output data signal corresponding to said data signal received by said host terminal from an external source; and a host terminal connected to said telephone line at said host station, said host terminal including a frequency-shift-keyed modulator connected to said telephone line applying a frequency-shift-keyed signal to said line corresponding to a data signal received from an external source and a two-tone decoder connected to said telephone line, said decoder generating a data byte identifying the tone pair being received.

15. The system of claim 14 wherein said frequency detector means includes means for measuring the time interval between successive signals of said zero-crossing indicator signal and comparing said measured interval to a predetermined time constant to determine if said measured interval corresponds to said high-frequency signal or low-frequency signal.

16. The system of claim 15 wherein said measuring and comparing means includes a charging circuit for providing a time-dependent charge to a capacitor during the time interval between successive signals of said zero-crossing indicator signal, and a voltage level detector for sensing the level of charge on said capacitor and comparing said charge to a preselected voltage level, said voltage level detector generating said frequency indicator signal, said preselected voltage level corresponding to a charge on said capacitor between the charge achieved during occurrence of said high-frequency signal and the charge achieved during occurrence of said low-frequency signal.

17. The system of claim 16 wherein said charging circuit includes a parallel resistor/capacitor pair, and said voltage level detector includes a Schmidt trigger.

18. The system of claim 14 wherein said zero-crossing detector means includes a first differentiator for differentiating high-to-low transitions of said received frequency-shift-keyed signal, and a second differentiator for differentiating low-to-high transitions of said received frequency-shift-keyed signal, said first and second differentiators generating said zero-crossing indicator signal.

* * * * *